United States Patent
Meggiolan

(10) Patent No.: US 11,807,035 B2
(45) Date of Patent: Nov. 7, 2023

(54) ABUTMENT INTERFACE BETWEEN THE HEAD OF A NIPPLE AND THE BRIDGE OF A WHEEL RIM AND SPOKED BICYCLE WHEEL

(71) Applicant: CAMPAGNOLO S.r.l., Vicenza (IT)

(72) Inventor: Mario Meggiolan, Creazzo (IT)

(73) Assignee: CAMPAGNOLO S.r.l., Vicenza (IT)

( * ) Notice: Subject to any disclaimer, the term of this patent is extended or adjusted under 35 U.S.C. 154(b) by 279 days.

(21) Appl. No.: 17/101,849

(22) Filed: Nov. 23, 2020

(65) Prior Publication Data

US 2021/0162801 A1     Jun. 3, 2021

(30) Foreign Application Priority Data

Nov. 29, 2019 (IT) .......................... 102019000022500

(51) Int. Cl.
*B60B 1/04* (2006.01)
(52) U.S. Cl.
CPC .............. *B60B 1/044* (2013.01); *B60B 1/041* (2013.01)
(58) Field of Classification Search
CPC ......... B60B 1/041; B60B 1/044; B60B 1/045; B60B 21/062
See application file for complete search history.

(56) References Cited

U.S. PATENT DOCUMENTS

| 5,651,591 A * | 7/1997 | Mercat ................. B60B 21/026 301/58 |
| 2014/0239703 A1 | 8/2014 | Walthert et al. |
| 2019/0168536 A1 * | 6/2019 | Meggiolan .............. B60B 1/041 |

FOREIGN PATENT DOCUMENTS

| DE | 10 2013 002968 A1 | 8/2014 | |
| EP | 714791 A1 * | 6/1996 | ........... B60B 21/025 |
| EP | 0 860 301 A1 | 8/1998 | |
| FR | 2513185 A * | 3/1983 | ............. B60B 1/041 |
| GB | 666584 A * | 2/1952 | |
| GB | 2 479 958 A | 11/2011 | |

OTHER PUBLICATIONS

Italian Search Report and Written Opinion in Italian Application No. 102019000022500, dated Nov. 29, 2019 with English translation.
European Office Action issued for EP Patent Application No. 20209342.3 filed on Nov. 23, 2020, on behalf of Campagnolo S.R.L., dated Feb. 1, 2023, 7 Pages.
Extended European Search Report issued for EP Patent Application No. 20209342.3 filed on Nov. 23, 2020, on behalf of Campagnolo S.R.L., dated Apr. 29, 2021, 8 Pages.

* cited by examiner

*Primary Examiner* — Kip T Kotter

(74) *Attorney, Agent, or Firm* — Steinfl + Bruno LLP

(57) ABSTRACT

An abutment interface located between a spoke attachment nipple and a bridge of a rim to properly align the tensioned spoke with the rim. The abutment interface includes a first washer with a radially inner face that abuts the bridge and a radially outer face that abuts with a radially inner face of a second washer that has a radially outer face that abuts an enlarged head on the nipple. The faces of two washers are complimentarily shaped and adjust with respect to each other and the nipple head. An initial adjustment takes place when the fixing the spoke to the rim and the washers prevent any further adjustment when fixing the spoke to the rim.

17 Claims, 4 Drawing Sheets

ABUTMENT INTERFACE BETWEEN THE HEAD OF A NIPPLE AND THE BRIDGE OF A WHEEL RIM AND SPOKED BICYCLE WHEEL

CROSS REFERENCE TO RELATED APPLICATION

This application claims the benefit of Italian Application No. 102019000022500, filed on Nov. 29, 2019 which is incorporated herein by reference as if fully set forth.

FIELD OF INVENTION

The present invention relates generally to spoked bicycle wheels, and in particular it relates to fixing the spokes to the wheel rim through nipples.

BACKGROUND

In the entire present description and in the claims, the spatial indications, such as in particular those of radial, axial or circumferential direction, will be given with reference to the rotation axis of the wheel of the bicycle, unless indicated otherwise.

It is well known that in spoked bicycle wheels each single spoke is fixed to the rim of the wheel through a respective nipple, which is a component with a stem provided with a threading (normally internal) and an enlarged head. The rim is provided with a plurality of holes in the bridge thereof (or in the lower bridge thereof, in the case of a rim with two or more bridges). The stem of a nipple is inserted in each hole in the bridge from a radially outer direction, while the head remains outside the bridge hole. The stem of the nipple is thus screwed to the end of a spoke. In this way, the nipple provides the hooking of the spoke to the rim and allows the tensioning thereof: by rotating the nipple, indeed, it is possible to screw in or unscrew the spoke with respect to the stem. Often an abutment washer is arranged between the nipple head and the bridge to improve the contact, particularly when the material of the rim is delicate (for example aluminium or composite materials) and it could be damaged by an excessively high pressure exerted by the nipple on a limited area.

During tensioning, the nipple should ideally be arranged aligned with the spoke, as a substantial extension thereof. This is normally true, because normally the spoke is arranged in the wheel in a substantially radial direction.

The Applicant has, however, observed that if the spoke is not arranged in the radial direction, for example because it is fastened tangentially to a flange of the hub of the wheel, the tensioning of the spoke-nipple set results in a misalignment between the two, due to the unbalanced abutment of the nipple on the bridge. Indeed, the natural abutment of the nipple (with or without washer) is with the stem in the radial direction, perpendicular to the bridge (or rather to the tangent thereof); if, however, the spoke is not in the radial direction, the nipple fastened to it is also not in the radial direction, before tensioning begins; in this position, the stem of the nipple forms two different angles with the direction tangential to the bridge (observing in the axial direction), one less than 90° and one greater than 90°. Proceeding with tensioning, the head of the nipple will tend to press on the bridge more on one side than on the other, in particular more on the side of the angle greater than 90°, thereby tending to take the tensioned nipple back towards a radial position.

This deviation of the nipple with respect to the direction of the spoke increases as the tensioning proceeds and results in an anomalous distribution of stresses on the spoke, on the nipple and on the bridge of the rim. In particular, the nipple is subjected to stresses not only in the radial direction but also in the tangential direction; the spoke is also subject not only to traction forces, but also to flexing forces. The consequence of this anomalous distribution of stresses is that the designer is forced to somehow oversize these components, in order to avoid yielding. This, however, results is an increase in weight, particularly undesirable in high-performance bicycles, in particular racing bicycles.

It has been proposed to address this drawback by shaping both the head of the nipple and the face of the washer on which it abuts according to spherical surfaces. However, even with this provision the misalignment between spoke and nipple is not avoided.

Indeed, it has been observed that in order to obtain the desired result of the alignment between spoke and nipple in the finished wheel, even when the spoke is in a non-radial direction in the wheel, it is important for the coupling between nipple and rim to have two features, apparently contrasting: firstly, to be such as to allow the nipple to be arranged in the direction of the spoke at the start of the tensioning operation; and then, to be such as to prevent movements of the nipple with respect to the rim during tensioning, so that in the finished wheel the nipple is aligned with the spoke.

The problem at the basis of the present invention is to allow a coupling between spoke, nipple and bridge in which the alignment between spoke and nipple is maintained during tensioning and thus in the finished wheel, even when the spoke is not arranged in the radial direction.

SUMMARY

The Applicant has found that providing an abutment interface between a spoke attachment nipple and a bridge of a rim can properly align the tensioned spoke with the rim. A preferred abutment interface includes a first washer with a radially inner face that abuts the bridge and a radially outer face that abuts with a radially inner face of as second washer that has a radially outer face that abuts an enlarged head on the nipple. The faces of two washers are complementarily shaped to allow them to adjust both with respect to each other and with respect to the nipple head. The adjustment takes place during an initial step of the fixing operation of the spoke to the rim and to prevent the washers from making any adjustment movement during a subsequent fixing step of the spoke to the rim during which the nipple will have a tension applied to it through the spoke.

BRIEF DESCRIPTION OF THE DRAWINGS

Further features and advantages of the invention will become clearer from the following description of some preferred embodiments thereof, made with reference to the attached drawings. In such drawings.

DETAILED DESCRIPTION OF THE PREFERRED EMBODIMENTS

Figure 1:
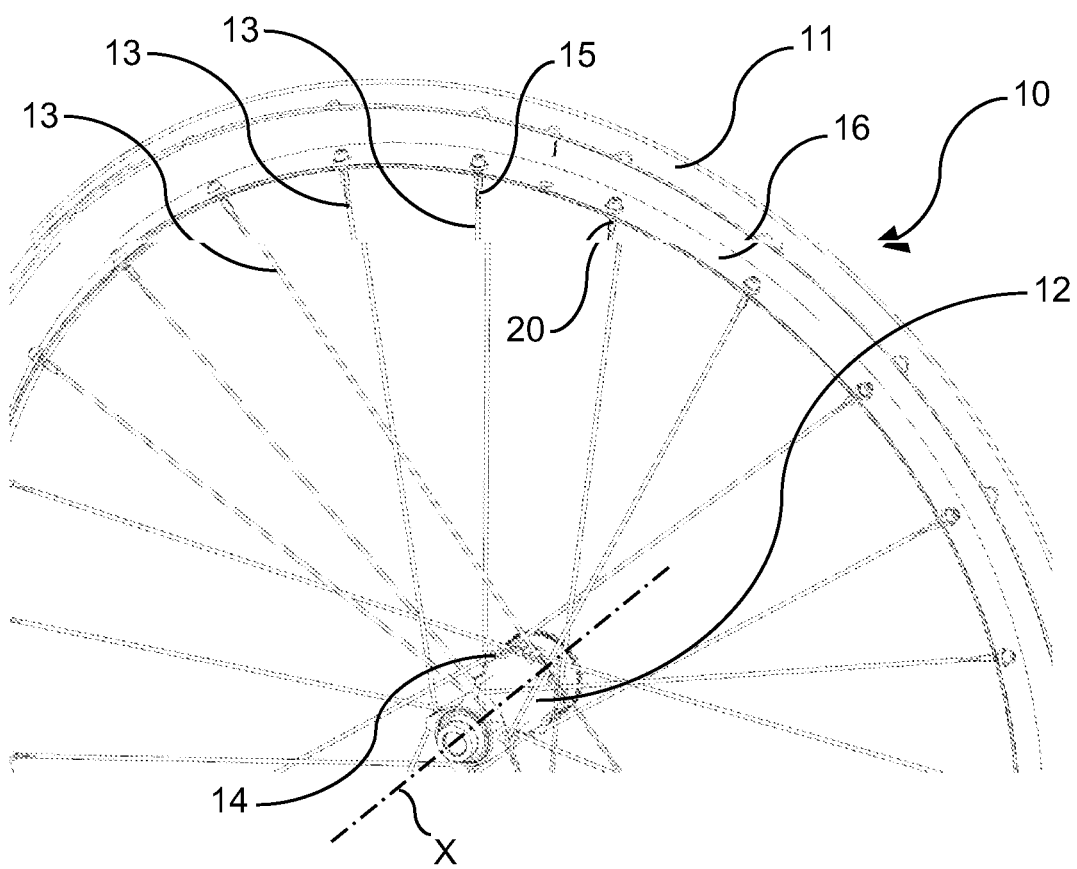
FIG. 1 is a partial perspective view of a bicycle wheel according to the invention.

The present invention relates to an abutment interface for controlling the attachment angle between a spoke and a spoke nipple in rim of a bicycle wheel.

In general, the invention controls the abutment interface between a nipple head and a bridge of a rim of a bicycle wheel has complementary washers. A first washer has a radially inner first face for abutting on the bridge and a radially outer second face. A second washer has a radially inner first face abutting on the second face of the first washer and a radially outer second face for abutting on the nipple head. The faces of the washers are shaped to allow the washers to make adjustment movements both with respect to each other and with respect to the nipple, during an initial step of the fixing operation of the spoke to the rim, and vice-versa to prevent the washers from making any adjustment movement both with respect to one another and with respect to the nipple during a subsequent fixing step of the spoke to the rim.

In a preferred embodiment of the invention, the aforementioned adjustment features are obtained by providing that the abutment between the second face of the first washer and the first face of the second washer takes place along a first abutment track and the abutment between the second face of the second washer and the head of the nipple takes place along a second abutment track, wherein the first and/or the second abutment track have an extension of less than 15%, and preferably less than 10%, of the area of the first face and of the area of the second face of the second washer, respectively. The measurement of the extension of the abutment tracks is meant to be carried out before the tensioning of the spoke, since tensioning naturally implies an increase in the extension of the abutment tracks, due to the deformability of the materials. With the aforementioned values, at least one among the contact between the two washers and the contact between the second washer and the nipple takes place over a limited area, much less than the area of the faces of the second washer; this allows both great initial freedom of movement, when tension is not yet applied, and subsequent substantial locking, when the tension applied on these small areas results in high contact pressures and thus high friction.

Preferably, both the first and the second abutment tracks have limited extension, so that the two aforementioned features (initial freedom of movement and prevention of movement under tension) occur singularly both between the two washers themselves, and between the second washer and the nipple.

Thanks to this abutment, in the initial step of mounting when the tensioning is zero or minimal, the nipple and the two washers are free to take a position also in a non-radial direction of the wheel, guided by the coupling of the nipple with the spoke. However, as soon as the tension becomes substantial, the abutment tracks having limited extension ensure that the high pressure that is immediately established both between the washers and between the second washer and the nipple prevents any further mutual movement, despite the natural tendency to be oriented in the radial direction due to the tension applied. As the tension progressively increases (and therefore the tendency of the nipple to move towards the radial direction increases), the pressure at the abutment tracks becomes so high as to prevent any movement.

Preferably, the first and/or the second abutment tracks are lines, i.e. they have substantially zero width, which maximizes the contact pressure. Of course, this geometric condition refers to the initial conditions, before tensioning, and is lost as the tension applied increases, due to the deformation of the materials.

Preferably, the first face of the second washer is delimited by a first inner circumference and a first outer circumference and the second face of the second washer is delimited by a second inner circumference and a second outer circumference, whereby the first abutment track coincides with the first outer circumference and the second abutment track coincides with the second inner circumference. In this way, the feature of the abutment tracks of minimal width is obtained in a constructively simple manner.

Preferably, the first and the second face of the second washer are conical or spherical. These surfaces are relatively simple to obtain and ensure the desired results in terms of abutment.

Preferably, the first face of the second washer is conical. Preferably, the second face of the second washer is conical. Preferably, the second face of the first washer is spherical. These features of shape, singularly or preferably all together, facilitate the onset of the conditions of initial freedom of movement and prevention of movement under tension.

Preferably, the second washer is conical, with vertex facing towards the first washer and angle at the vertex comprised between 70° and 120°, preferably between 85° and 105°, more preferably equal to about 95°. This shape promotes the aforementioned abutment conditions.

In another aspect, the invention relates to a bicycle wheel comprising a rim connected to a hub by a plurality of spokes having an abutment interface between the nipple head and the bridge of the rim. The abutment interface has a first washer with a radially inner first face abutting on the bridge and a radially outer second face for abutment with a second washer, with a radially inner first face abutting on the second face of the first washer and a radially outer second face abutting on the head of the nipple. The faces of the washers are shaped to allow the washers to make adjustment movements both with respect to each other and with respect to the nipple, during an initial step of the fixing operation of the spoke to the rim, and vice-versa to prevent the washers from making any adjustment movement both with respect to one another and with respect to the nipple, during a subsequent fixing step of the spoke to the rim.

Preferably, the first washer has an opening of a width that would allow the head of the nipple to pass, in the absence of the second washer. This large width of the opening of the first washer facilitates the freedom of movement between the two washers and thus facilitates the alignment, at the start of tensioning of the spoke with the nipple.

Preferably, the head of the nipple has a spherical surface facing towards the second face of the second washer. The spherical surface of the head of the nipple promotes the abutment conditions described above, making it easier to limit the extension of the second abutment track. Preferably, the spherical surface of the head of the nipple has a radius comprised between 2 and 4 mm, more preferably equal to about 3 mm.

Preferably, the stem of the nipple is joined to the head of the nipple according to a joining angle comprised between 25° and 60°, more preferably between 30° and 50°. This angle is intended as the angle formed by the axis of the stem of the nipple with a plane tangent to the head of the nipple in the point in which the head of the nipple is joined to the stem of the nipple. The aforementioned values make it possible to obtain the desired abutment conditions, particularly in the case in which the second washer has the features of conicity indicated above.

Preferably, at least one of the spokes has orientation according to a non-radial direction with respect to the rotation axis of the wheel. It is, indeed, precisely the spokes with such a non-radial inclination that get the maximum benefit from the invention.

Preferably, the bridge of the rim is flat in the axial direction of the wheel. In this way, the construction of the rim is particularly simple; in particular, it does not require special processing to form shaped seats for the heads of the nipples. Moreover, thanks to the invention, a precise and balanced hooking of the head of the nipple is equally ensured, without there being misalignments between spoke and stem of the nipple during tensioning.

With reference to the figures, there is shown a bicycle wheel 10, comprising a rim 11 connected to a hub 12 by means of spokes 13 under tension; X is used to indicate the rotation axis of the wheel 10. As illustrated in FIG. 1, The spokes 13 have a head 14 with which they are fastened to the hub 12 and a threaded end 15 opposite to the head 14, with which they are hooked to a bridge 16 of the rim 11 through a nipple 20. The bridge 16 is flat in the axial direction, i.e. it extends on a cylindrical surface coaxial to the axis X.

Each nipple 20 comprises a stem 21 extending along an axis Y and a head 22 projecting outwardly with respect to the stem 21. The stem 21 of the nipple 20 is inserted in a hole 17 formed in the bridge 16 and projects from it in the radial direction towards the axis X of the wheel 10, whereas the head 22 remains in radially outer position with respect to the bridge 16. A threaded axial hole 23, engaged with the threaded end 15 of one of the spokes 13, is formed in the stem 21; the spoke 13 coupled with the nipple 20 is thus aligned along the axis Y. The nipple 20 also comprises a first handling portion 24 with non-round section (for example, hexagonal), formed externally on the stem 21, and a second handling portion 25 with non-round section (for example, square), formed externally on the head 22; the two handling portions 24 and 25 make it possible to rotate the nipple 20 with suitable keys (not shown) so as to screw in or unscrew the nipple 20 with respect to the spoke 13, thus obtaining a change in the length of the spoke 13—nipple 20 set and thus a change in the tension of such a set in the rim 11. The handling portion 24 or the handling portion 25 is used depending on the accessibility, i.e. depending on the shape of the rim 11. The head 22 of the nipple 20 has a convex spherical shape towards the stem 21.

Figure 2:
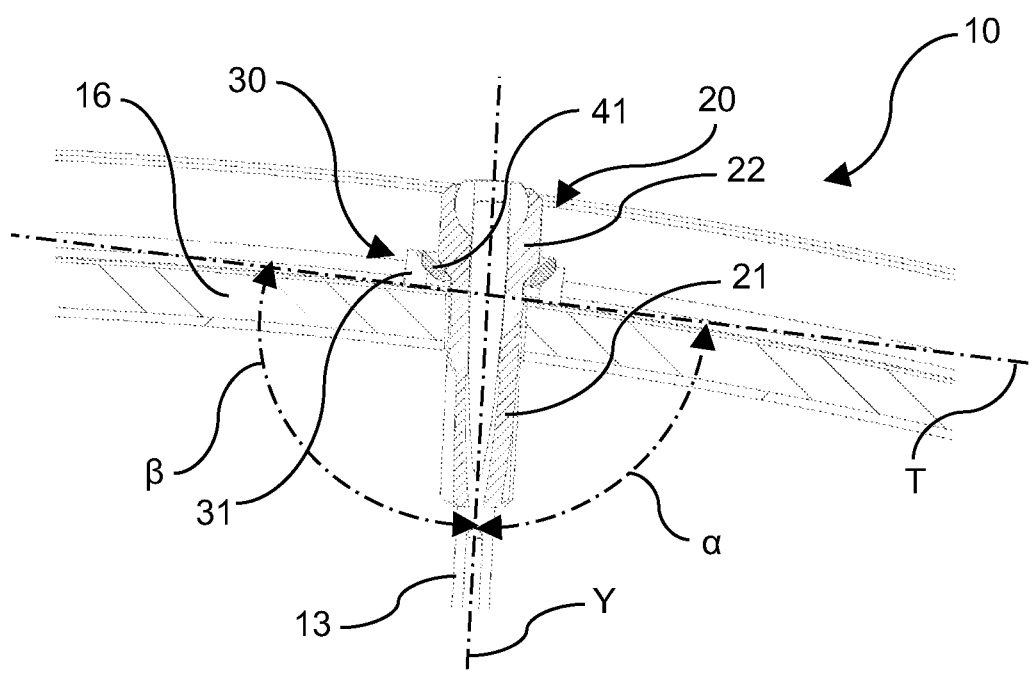
FIG. 2 is an enlarged section view of a detail of the wheel of FIG. 1 with an abutment interface according to a first embodiment of the invention, taken according to a plane perpendicular to the axis of the wheel.
Figure 3:
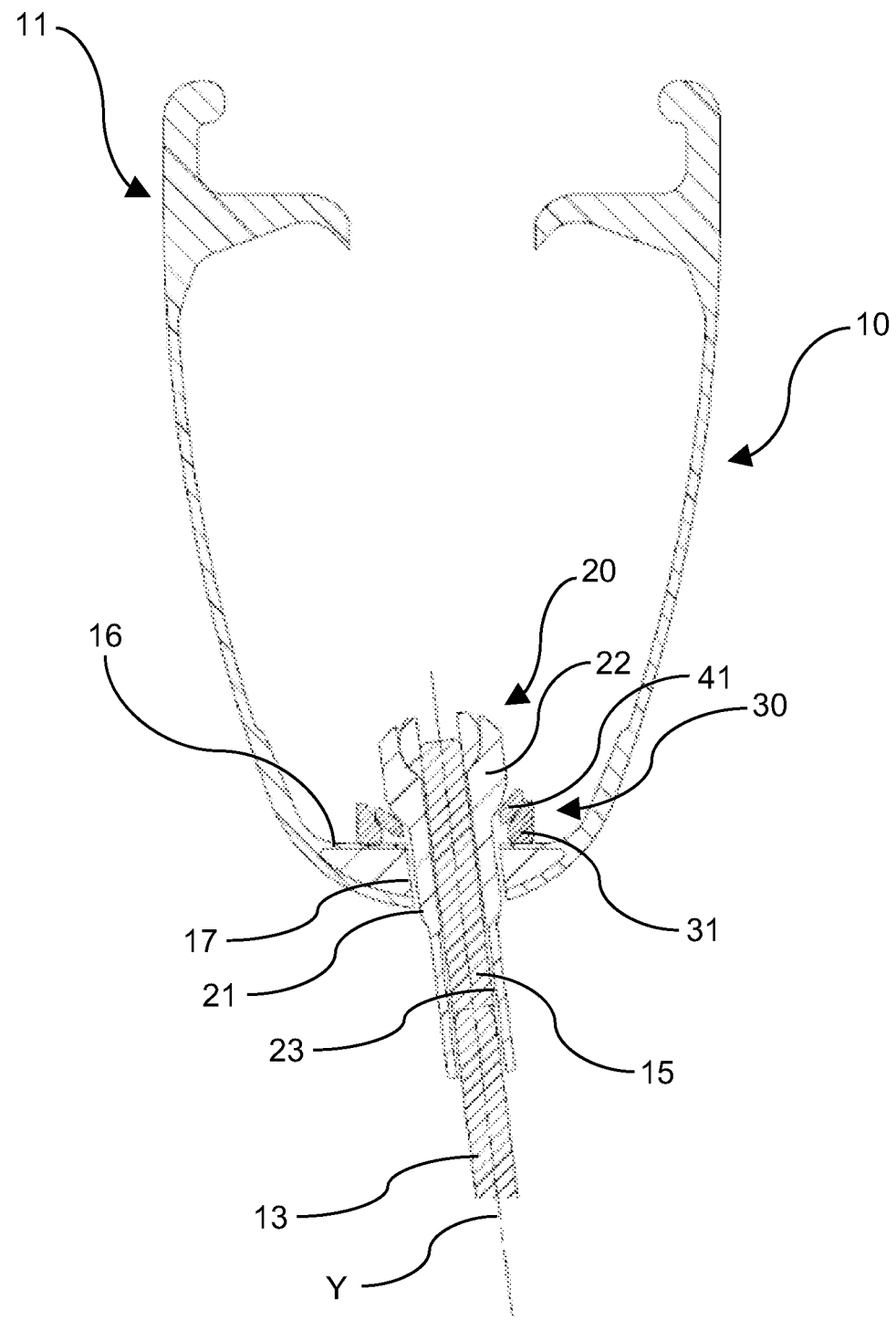
FIG. 3 is an enlarged section view of the detail of FIG. 2, taken along a plane containing the axis of the wheel.
Figure 4:
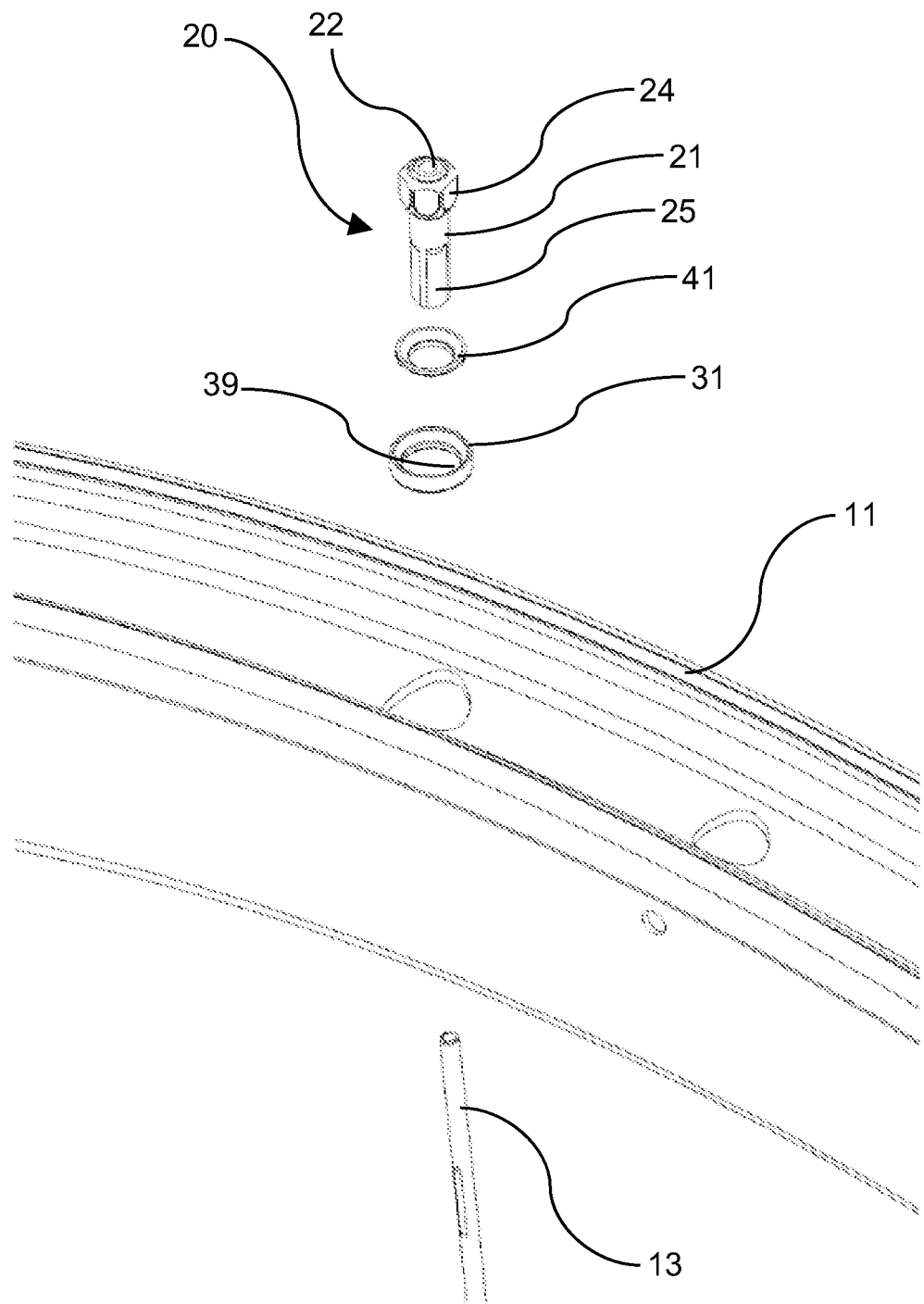
FIG. 4 is an exploded view of the wheel of FIG. 1, highlighting the abutment interface of FIGS. 2 and 3.
Figure 5:
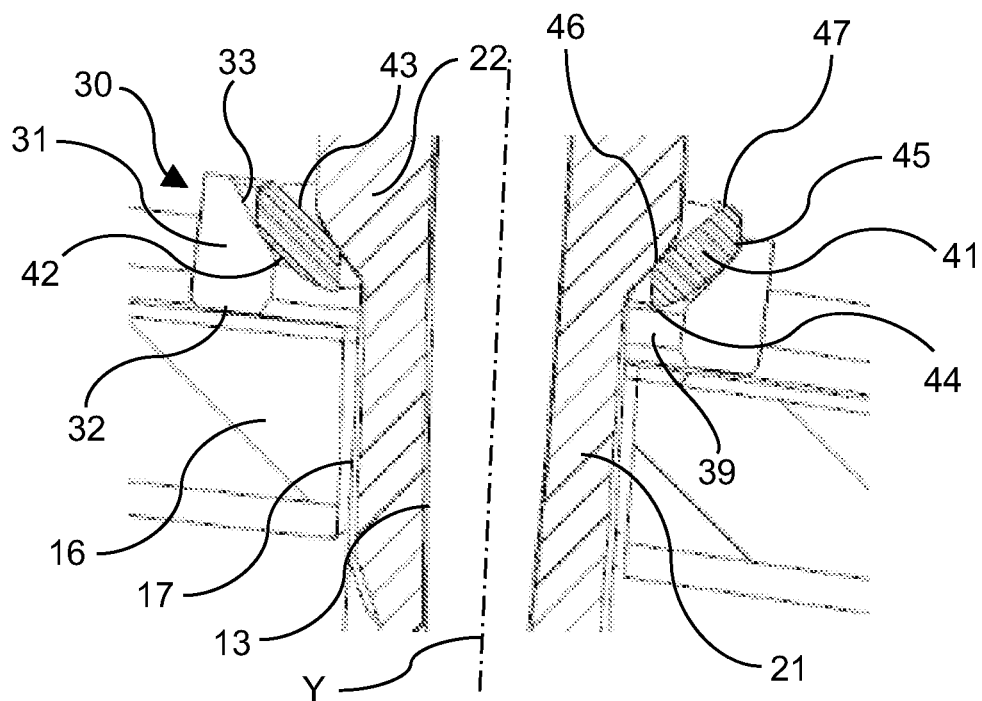
FIG. 5 is a further enlarged section view of the abutment interface shown in FIG. 2.

In the illustrated wheel 10 of FIG. 1, some of the spokes 13 have substantially radial orientation, others have markedly non-radial orientation; when seen from the axial direction of the wheel 10, the spokes 13 with substantially radial orientation form substantially right angles with the bridge 16 (i.e. with the tangent T to the bridge 16), whereas the spokes 13 with markedly non-radial orientation form an acute angle α and an obtuse angle ß with the bridge 16 (see FIG. 2).

Between the head 22 of the nipple 20 and the bridge 16 an abutment interface 30 is arranged, which comprises a first annular washer 31 and a second annular washer 41. The first washer 31 is in contact with the bridge 16, whereas the second washer 41 is in contact with the nipple 20.

With reference to FIGS. 2-5, the first washer 31 has a radially inner first face 32, which rests on the bridge 16, and a radially outer second face 33, which rests against the second washer 41. The first face 32 is substantially flat, whereas the second face 33 is concave, with spherical shape. Centrally, the first washer 31 has a very wide opening 39: the head 22 of the nipple 20 could easily pass through it, if not held by the second washer 41, as will be seen hereinafter.

The second washer 41 has a radially inner first face 42, which rests on the first washer 31, and a radially outer second face 43, which rests against the spherical head 22 of the nipple 20. The faces 42 and 43 are both conical, with vertex facing towards the first washer 31, i.e. towards the axis X of the wheel 10. The angle at the vertex of the cone of the two faces 42 and 43 is comprised between 70° and 120°, preferably between 85° and 105°; in particular and more preferably, such an angle is about 95°. It should be noted that this angle at the vertex is not represented graphically in the figures, so as not to complicate the figures with further lines.

The first face 42 of the second washer 41 is delimited by a first inner circumference 44 and by a first outer circumference 45; the second face 43 of the second washer 41 is delimited by a second inner circumference 46 and by a second outer circumference 47. The inner circumferences 44 and 46 are wide enough to allow the stem 21 of the nipple 20 to pass, but not the head 22 of the nipple 20.

Between the second face 33 of the first washer 31 and the first face 42 of the second washer 41 a first abutment track is defined, which ideally coincides with the first outer circumference 45 of the first face 42 of the second washer 41. Between the second face 43 of the second washer 41 and the head 22 of the nipple 20 a second abutment track is defined, which ideally coincides with the second inner circumference 46 of the second face 43 of the second washer 41. In reality, the aforementioned abutment tracks can comprise a narrow band around the respective circumferences 45 and 46, provided that they are indeed narrow, in particular so that the area of the abutment tracks does not exceed 15% (and preferably 10%) of the area of the respective faces 42 and 43 of the second washer 41. Of course, what has just been stated refers to the initial mounting conditions of the wheel 10, i.e. before a substantial tension is applied between the spoke 13 and the nipple 20; under the traction stress due to tensioning, the abutment tracks tend clearly to widen due to the deformability of the materials.

In the construction of the wheel 10, the mounting of every spoke 13 (whatever the inclination thereof with respect to the radial direction) takes place by firstly fastening the spoke 13 with its head 14 to the hub 12. Thereafter, a nipple 20 is inserted with its stem 21 in the hole 17 of the bridge 16, interposing the abutment interface 30, i.e. the two washers 31 and 32; the first washer 31 is placed with its first face 32 against the bridge 16, the second washer 32 with its first face 42 against the second face 33 of the first washer 31. It should be noted that the width of the opening 39 of the first washer 31 would not be such as to hold the head 21 of the nipple 20, which would easily pass through it if the second washer 41 was not present.

By rotating the nipple 20, it is thus possible to screw it to the threaded end 15 of the spoke 13, until the contact is established at the abutment tracks 45 and 46. In this condition, the freedom of movement ensured by the washers 31 and 41 allows the nipple 20 to be arranged easily as an extension of the spoke 13, so that the assembly of spoke 13 and nipple 20 is perfectly aligned according to the axis Y, even if it does not coincide with a radial direction of the wheel 10.

By further rotating the nipple 20, there is thus progressive tensioning of the nipple 20 at the spoke 13, so that they exert a traction between the rim 11 and the hub 12. This tensioning, thanks to the very limited extension of the abutment tracks 45 and 46, quickly causes a high contact pressure between the parts, in particular between the nipple 20 and the second washer 41 and between the latter and the first washer 31. The friction that is produced due to this high pressure prevents any mutual movement of the washers 31, 41 and of the nipple 20, ensuring that the alignment of the nipple 20 and of the spoke 13 along the axis Y is maintained, even if such an axis Y is not oriented radially in the wheel 10, see FIG. 2. Consequently, the spoke 13 is not subjected to bending stress and the nipple 20 is not subjected to stresses in the tangential direction.

Figure 6:
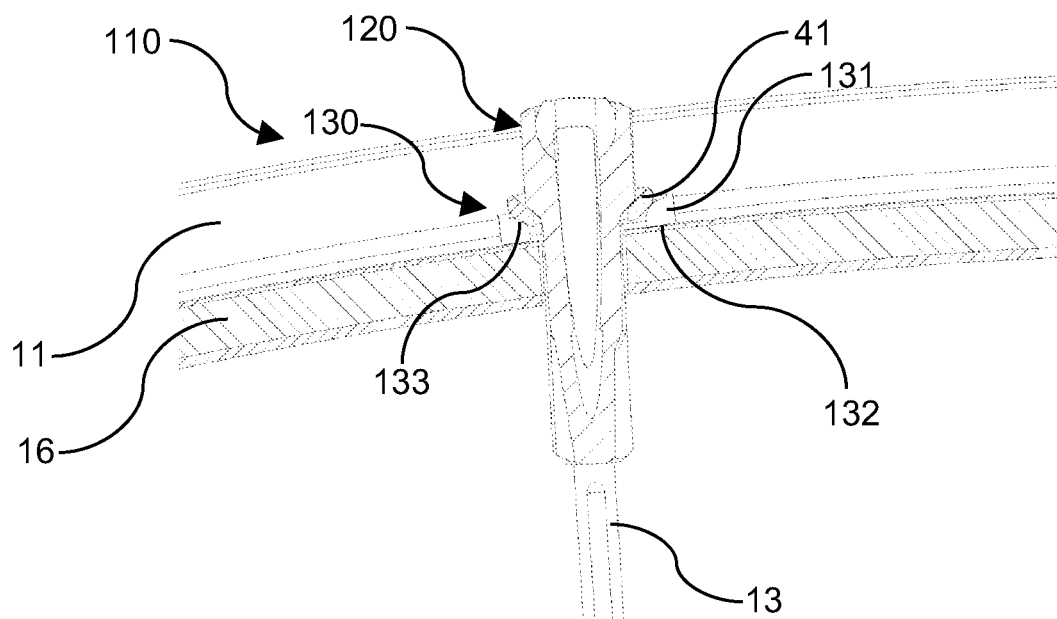
FIG. 6 is an enlarged section view of a wheel with an abutment interface according to a second embodiment of the invention.

FIG. 6 shows a wheel 110 according to a second embodiment of the invention; elements of the wheel 110 the same as those of the wheel 10 are indicated by the same reference numerals and are not described, whereas elements corresponding generally but that are in some way different are indicated with reference numerals increased by 100 and are described by comparison with the elements of the wheel 10.

In the wheel 110, the nipples 120 differ from the nipples 20 because their head 122 has a conical shape instead of spherical. The abutment interface 130 differs from the interface 30 for the shape of the second face of the first washer. More precisely, the first washer 131 has its first face 132 flat (like the face 32 of the washer 31), whereas its second face 133 has a substantially toric shape. The second washer, on the other hand, is substantially the same as the washer 41.

Consequently, as can be seen in FIG. 6, the first abutment track is defined roughly in an intermediate annular area in the first face 42 of the second washer 41, whereas the second abutment track is defined on an inner area of the second face 43 of the second washer 41. The first abutment track—even if different from that of the interface 30—still remains narrow (preferably with an area of less than 15% of the area of the first face 42 of the second washer 41, more preferably less than 10% thereof); the second abutment track, on the other hand, has a wider extension, but still less than 40%. For this reason, the abutment interface 130 is less suitable where the inclination of the spoke with respect to the radial direction is very high.

The construction of the wheel 110 takes place in the same way already described for the wheel 10.

The conditions described above, whereby the first abutment track between the first washer and the second washer and/or the second abutment track between the second washer and the nipple have limited extension, can also be obtained with other combinations of shapes of the faces of the washers, as well as of the nipple.

An embodiment that is not illustrated could, for example, provide for a nipple with conical head, a conical second washer (with two conical faces) and a first washer with the second face also conical. In this case, the abutment tracks having limited extension are obtained by selecting conical shapes with different angles at the vertex: for example, an angle at the vertex of the conical second washer that is markedly greater than the angle at the vertex of the nipple and of the second face of the first washer.

Another embodiment that is not illustrated could, for example, be similar to the wheel 10, with the sole difference that the second face of the first washer is not spherical but rather conical or toric.

Another embodiment could, for example, be similar to the wheel 110, with the sole difference that the second face of the first washer is not toric, but rather spherical, with concavity facing towards the second washer.

Another embodiment could, for example, be similar to the wheel 10 or to the wheel 110, with the nipple conical instead of spherical; in this case, the second washer (conical) has a different angle at the vertex, in particular greater, with respect to the nipple.

Other embodiments could, for example, provide that one or other of the faces of the second washer be spherical or toric.

In the choice of the shape of the nipple, of the two faces of the second washer and of the second face of the first washer there is thus a certain freedom, provided that dimensional values (angles at the vertex of the conical surfaces, radii of curvature of the spherical or toric surfaces) are chosen that make it possible to have the first abutment track between the first washer and the second washer and/or the second abutment track between the second washer and the nipple with limited extension; the advantage begins to be visible if the extension is less than 40%, without departing from the indicated optimal values.

What is claimed is:

1. An abutment interface for insertion between a head of a nipple for fixing a spoke and a bridge of a rim of a bicycle wheel, the abutment interface comprising:
   a first washer with a radially inner first face for abutting on the bridge and a radially outer second face; and,
   a second washer with a radially inner first face abutting on the second face of the first washer and a radially outer second face for abutting on the head of the nipple;
   wherein the radially inner first face of the second washer and the radially outer second face of the first washer are shaped for adjustment movements with respect to each other and with respect to the nipple during an initial step of fixing a spoke to the rim, and to prevent the first and second washers from making any adjustment movement both with respect to each other and with respect to the nipple during a subsequent step of fixing the spoke to the rim in which a tension is applied to the nipple through the spoke,
   wherein the abutment between the radially outer second face of the first washer and the radially inner first face of the second washer takes place along a first abutment track and the abutment between the radially outer second face of the second washer and the head of the nipple takes place along a second abutment track, wherein at least one of the first abutment track or the second abutment track has an extension of less than 15% of an area of the radially inner first face and of an area of the radially outer second face of the second washer respectively, and
   wherein the first washer has an opening of a width dimensioned to allow the head of the nipple to pass through, when the second washer is absent.

2. The abutment interface according to claim 1, wherein at least one of the first abutment track or the second abutment track are lines.

3. The abutment interface according to claim 2, wherein the first face of the second washer is delimited by a first inner circumference and a first outer circumference and wherein the second face of the second washer is delimited by a second inner circumference and a second outer circumference, wherein the first abutment track coincides with the first outer circumference and the second abutment track coincides with the second inner circumference.

4. The abutment interface according to claim 1, wherein the first and the second face of the second washer are conical or spherical.

5. The abutment interface according to claim 4, wherein the first face of the second washer is conical.

6. The abutment interface according to claim 4, wherein the second face of the second washer is conical.

7. The abutment interface according to claim 4, wherein the second face of the first washer is spherical or toric.

8. The abutment interface according to claim 1, wherein the second washer is conical and has a vertex facing towards the first washer and an angle defined by the vertex is comprised between 70° and 120°.

9. The abutment interface according to claim 8, wherein angle defined by the vertex is comprised between 85° and 105°.

10. The abutment interface according to claim 8, wherein angle defined by the vertex is equal to about 95°.

11. The abutment interface of claim 1 wherein the area is less than 10%.

12. A bicycle wheel comprising: a rim connected to a hub by a plurality of spokes, wherein at least one of the plurality of spokes is anchored to the rim through a nipple having a stem that is dimensioned to be inserted in a hole in a bridge of the rim and face towards the hub, and an enlarged head that is dimensioned to be hooked to the bridge, and an abutment interface positioned between the head of the nipple and the bridge of the rim, wherein the abutment interface comprises:
a first washer with a radially inner first face for abutting on the bridge and a radially outer second face; and,
a second washer with a radially inner first face abutting on the second face of the first washer and a radially outer second face for abutting on the head of the nipple;
wherein the radially inner first face of the second washer and the radially outer second face of the first washer are shaped for adjustment movements with respect to each other and with respect to the nipple during an initial step of fixing a spoke to the rim, and to prevent the first and second washers from making any adjustment movement both with respect to each other and with respect to the nipple during a subsequent step of fixing the at least one spoke to the rim in which a tension is applied to the nipple through the at least one spoke,
wherein the abutment between the radially outer second face of the first washer and the radially inner first face of the second washer takes place along a first abutment track and the abutment between the radially outer second face of the second washer and the head of the nipple takes place along a second abutment track, wherein at least one of the first abutment track or the second abutment track has an extension of less than 15% of an area of the radially inner first face and of an area of the radially outer second face of the second washer respectively, and
wherein the first washer has an opening of a width dimensioned to allow the head of the nipple to pass through, when the second washer is absent.

13. The bicycle wheel according to claim 12, wherein the head of the nipple has a spherical surface facing towards the second face of the second washer.

14. The bicycle wheel according to claim 12, wherein said at least one spoke has an orientation according to a non-radial direction with respect to the rotation axis of the wheel.

15. The bicycle wheel according to claim 12, wherein the bridge of the rim is flat in an axial direction of the wheel.

16. An abutment assembly for an interface between a spoke nipple head and a rim of a bicycle wheel, the abutment assembly comprising:
a first washer with a radially inner face that abuts a bridge on the rim and a radially outer second face opposite the inner face; and,
a second washer with a radially inner face that abuts the radially outer second face of the first washer and a radially outer second face that abuts the spoke nipple head,
wherein the abutting faces of the first and second washers are shaped to allow adjusting movement between the first and second washers and with respect to the nipple head during an initial step of the fixing a spoke to the rim of the bicycle and to prevent any additional adjusting movement between the first and second washers and the nipple head as a result of tensioning a spoke within the nipple and securing the spoke the rim,
wherein the abutment between the radially outer second face of the first washer and the radially inner face of the second washer takes place along a first abutment track and the abutment between the radially outer second face of the second washer and the head of the nipple takes place along a second abutment track, wherein at least one of the first abutment track or the second abutment track has an extension of less than 15% of an area of the radially inner face and of an area of the radially outer second face of the second washer respectively, and
wherein the first washer has an opening of a width dimensioned to allow the head of the nipple to pass through, when the second washer is absent.

17. An abutment interface for insertion between a head of a nipple for fixing a spoke and a bridge of a rim of a bicycle wheel, the abutment interface comprising:
a single-piece annular first washer with a radially inner first face for abutting on the bridge and a radially outer continuously extending flat second face, the radially inner first face of the single-piece annular first washer being configured to rest on the bridge for an entirety of a circumference of the radially inner first face of the single-piece annular first washer; and,
a second annular washer with a radially inner first face abutting on the second face of the single-piece annular first washer and a radially opposite outer second face for abutting on the head of the nipple, the radially opposite outer second face of the second annular washer configured to be radially interposed between the single-piece annular first washer and the nipple and prevent contact between the single-piece annular first washer and the nipple,
wherein the radially inner first face of the second annular washer and the radially outer second face of the single-piece annular first washer are shaped for adjustment movements with respect to each other and with respect to the nipple while fixing a spoke to the rim, and to prevent the single-piece annular first washer and the second annular washer from making any adjustment movement both with respect to each other and with respect to the nipple while subsequently fixing the spoke to the rim in which a tension is applied to the nipple through the spoke, and wherein the single-piece annular first washer has an opening of a width dimensioned to allow the head of the nipple to pass through, when the second annular washer is absent.

* * * * *